(12) United States Patent
Roden et al.

(10) Patent No.: US 8,807,910 B1
(45) Date of Patent: Aug. 19, 2014

(54) VARIABLE COUNTERWEIGHT SYSTEM FOR A MATERIAL HANDLING VEHICLE

(76) Inventors: Thomas V. Roden, Port Washington, WI (US); Edward S. Werner, West Bend, WI (US)

( * ) Notice: Subject to any disclaimer, the term of this patent is extended or adjusted under 35 U.S.C. 154(b) by 151 days.

(21) Appl. No.: 13/199,356

(22) Filed: Aug. 27, 2011

Related U.S. Application Data

(63) Continuation-in-part of application No. 11/756,069, filed on May 31, 2007, now Pat. No. 8,007,222.

(51) Int. Cl.
*B66C 23/72* (2006.01)
*E02F 9/18* (2006.01)
*B62D 49/08* (2006.01)

(52) U.S. Cl.
CPC . *E02F 9/18* (2013.01); *B66C 23/72* (2013.01); *B62D 49/085* (2013.01)
USPC ........... 414/719; 414/673; 280/758; 212/198; 212/279

(58) Field of Classification Search
CPC ...... B66C 23/72; B62D 37/04; B62D 49/085; B66F 9/07554; E02F 9/18
USPC ............ 414/673, 719; 212/198, 279; 280/758
See application file for complete search history.

(56) References Cited

U.S. PATENT DOCUMENTS

| | | | | |
|---|---|---|---|---|
| 2,916,172 A | * | 12/1959 | Locke | 187/222 |
| 2,926,799 A | * | 3/1960 | Granryd | 414/719 |
| 3,497,095 A | | 2/1970 | Couberly | |
| 3,504,933 A | * | 4/1970 | Avis et al. | 280/759 |
| 3,630,317 A | * | 12/1971 | Jacobsson | 187/223 |
| 3,851,776 A | * | 12/1974 | Leyrat | 414/719 |
| 4,299,530 A | * | 11/1981 | Schaeff | 414/719 |
| 4,664,585 A | * | 5/1987 | Ambridge et al. | 414/563 |
| 4,861,069 A | * | 8/1989 | Gunter | 280/758 |
| 5,160,056 A | | 11/1992 | Yoshimatsu | |
| 5,219,180 A | | 6/1993 | Zipser | |
| 5,685,563 A | | 11/1997 | Ottestad | |
| 6,315,325 B1 | * | 11/2001 | Dunn | 280/755 |
| 7,497,641 B1 | * | 3/2009 | Frelich | 404/130 |
| 7,677,129 B2 | * | 3/2010 | Schena et al. | 74/490.05 |

* cited by examiner

*Primary Examiner* — Scott Lowe
(74) *Attorney, Agent, or Firm* — Mandy T. Garrels; Law office of Mandy T. Garrels LLC

(57) ABSTRACT

A movable counterweight system moves under a material-handling vehicle to provide a safe low center of gravity, and avoid interference to the operator.

4 Claims, 13 Drawing Sheets

VARIABLE COUNTERWEIGHT SYSTEM FOR A MATERIAL HANDLING VEHICLE

CROSS REFERENCE TO RELATED APPLICATIONS

Continuation in part of application Ser. No. 11/756,069 filed May 31, 2007, U.S. Pat. No. 8,007,222. No new matter has been added to this specification.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND

Field of Invention

The present invention relates generally to earth moving devices and more specifically to a variable counterweight system for a material handling vehicle, which increases the operational safety of the vehicle.

Background of the Invention

U.S. Pat. No. 2,926,799 to Granryd discloses a counterweight arrangement for a tractor loader. The Grandryd patent includes a counterweight that is pivoted on the rear of a tractor loader according to a position of a conventional bucket. U.S. Pat. No. 7,128,517 to Kurtz discloses a loader with extending bucket and counterbalance. The Jurtz patent includes a small loader machine of the skid-steered type having a counterweight to balance heavy loads in the loader bucket. The bucket is automatically extended forward as the counterweight is extended in the opposite direction so as to keep the machine always in reasonable balance.

There is a clearly felt need in the art for a variable counterweight system for a material handling vehicle, which includes a counterweight that is moved from the front of the material handling vehicle to the rear of the material handling vehicle, depending on a vertical position of an attachment, such as a bucket. Such a counterweight should have as low a center of gravity as possible for stability, have maximum effect, and be free of obstruction or danger points to the operator.

SUMMARY OF THE INVENTION

The present invention provides a variable counterweight system for a material handling vehicle, which includes a counterweight that is movable between the front and rear of the material handling vehicle. The variable counterweight system includes a counterweight and at least one linear transfer device. The counterweight may include a plurality of individual counterweight members. Horizontally adjacent counterweight members are preferably pivotally engaged with each other. Each linear transfer device preferably includes a moving track and a drive device. The moving track may be a chain or a belt. The drive device is preferably a hydraulic, electric or pneumatic motor. The moving track is retained on rotary axles. The rotary axles are preferably retained by a guide track. The moving track if preferably retained in the guide track. The drive device includes either a sprocket for driving the chain or a cog for driving the belt. A sprocket or cog is mounted to each rotary axle. At least one vertical sensor determines the position of a boom. At least one horizontal sensor determines the position of the counterweight relative to the vehicle. A control unit receives input from the vertical sensor, and human or sensor input as to whether the boom is lifting upward or pushing downward. In the case of lifting, if the boom is in an elevated position, the control unit powers the drive device to move the counterweight to the rear of the vehicle. In the case of pushing downward, for example digging dirt with a bucket or operating a drill or jackhammer or other, the counterweight is moved to the front of the vehicle to maximize downward force to the bucket, drill, or jackhammer. The variable counterweight could also be manually manipulated by an operator.

If the boom is in a lowered position, then the control unit powers the drive device to move the counterweight to the front of the vehicle. The drive device is powered until the counterweight reaches the front of the vehicle. A skid steer is one of many types of material handling vehicles. Accordingly, it is an object of the present invention to provide a variable counterweight system, which includes a counterweight that is moved from the front of the vehicle to the rear of the vehicle depending on a vertical position of an attachment such as a boom.

These and additional object, advantages, features and benefits of the present invention will become apparent from the following specification.

DETAILED DESCRIPTION OF THE PREFERRED EMBODIMENT

Figure 1:
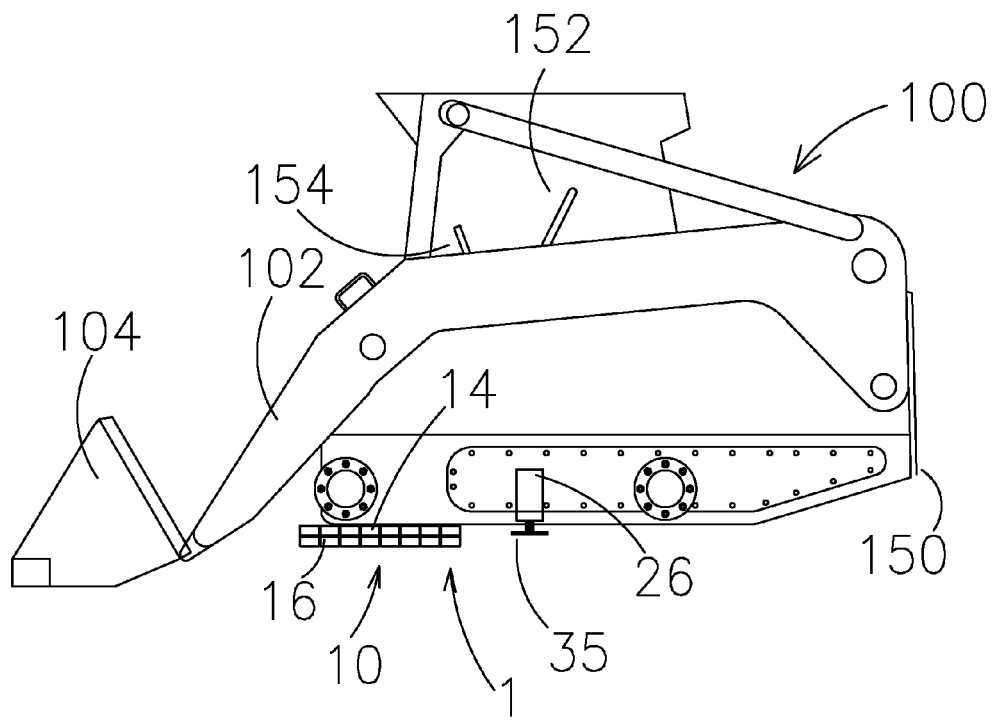
FIG. 1 is a side view of a material handling vehicle with a variable counterweight system, where a counterweight is position at the front of the vehicle.
Figure 2:
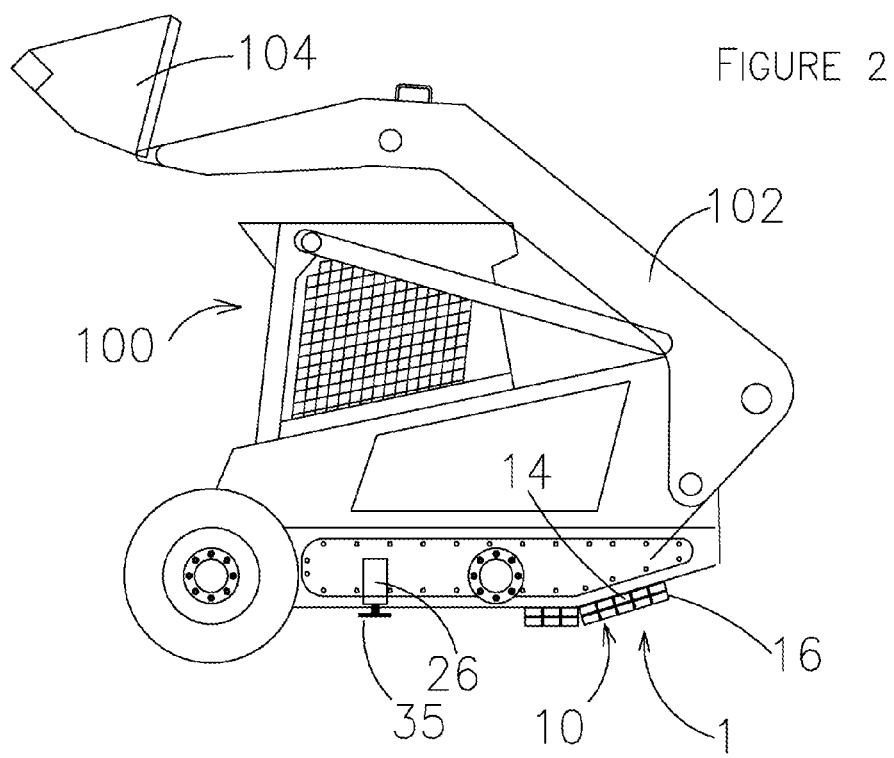
FIG. 2 is a side view of a material handling vehicle with a variable counterweight system, where a counterweight is position at the rear of the vehicle.
Figure 3:
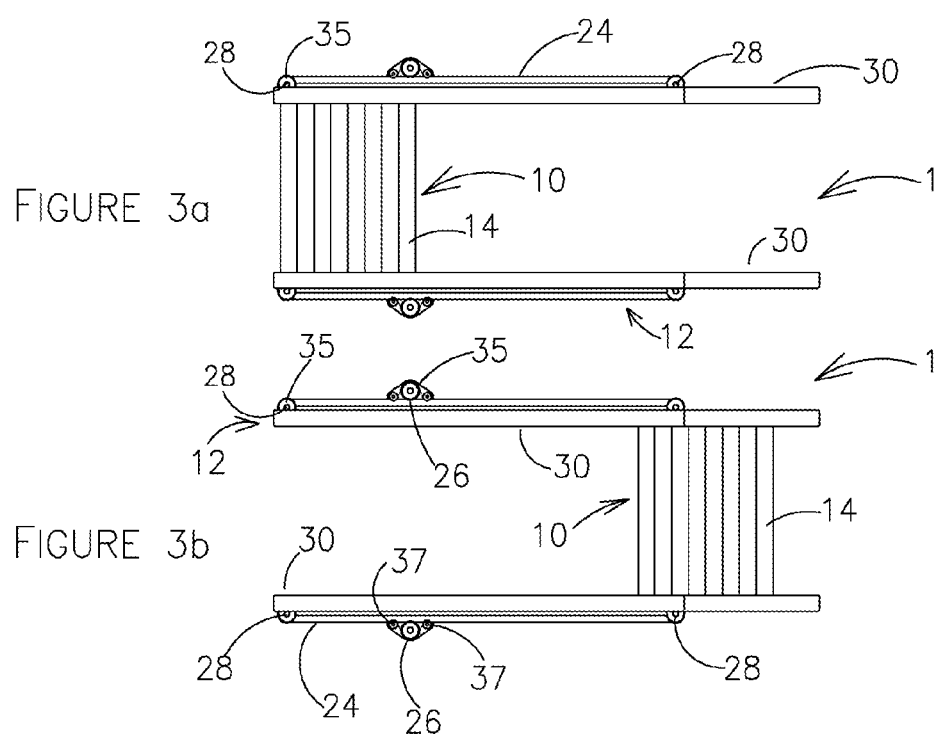
FIG. 3a is a top view of a variable counterweight system with a counterweight positioned at the front.
FIG. 3b is a top view of a variable counterweight system with a counterweight positioned at the rear.
Figure 4:
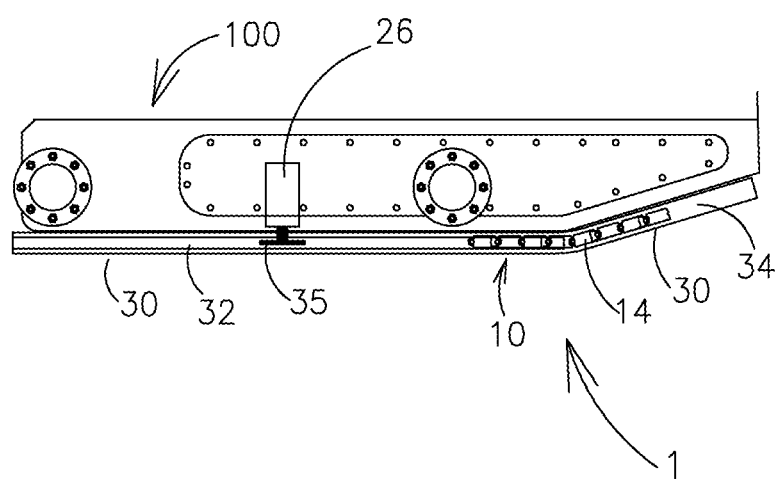
FIG. 4 is an enlarged side view of a material handling vehicle with a variable counterweight system, where a counterweight is positioned at the rear of the vehicle in a guide track.
Figure 5:
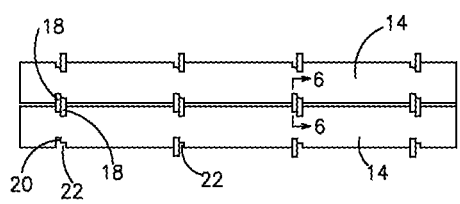
FIG. 5 is an enlarged top view of two weight members pivotally engaged with each other of a variable counterweight system.
Figure 6:
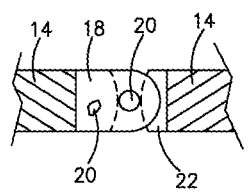
FIG. 6 is an enlarged top view of two weight members pivotally engaged with each other of a variable counterweight system.

Referring to FIG. 1, there is shown a material handling vehicle or machine 100 with a portion of a variable counterweight system 1, wheels omitted for visibility. The wheels disclosed are the type which contact the riding surface, typically earth, but the wheels could drive a tread for crawler-type vehicles. "Material handling" is construed to include not only movement of material within a component of the vehicle 100, but also material outside the vehicle 100, e.g. dirt which is scooped into the bucket 104, or material drilled or broken or otherwise transformed by the vehicle 100. A material handling machine comprising any type of industrial machine, whether or not having attached mobilizers such as wheels or is stationary by design, for purposes of handling material as defined above. A material handling vehicle being more specifically a material handling machine having a mobilizing feature such as wheels or rotating tractor belt.

Figure 13:
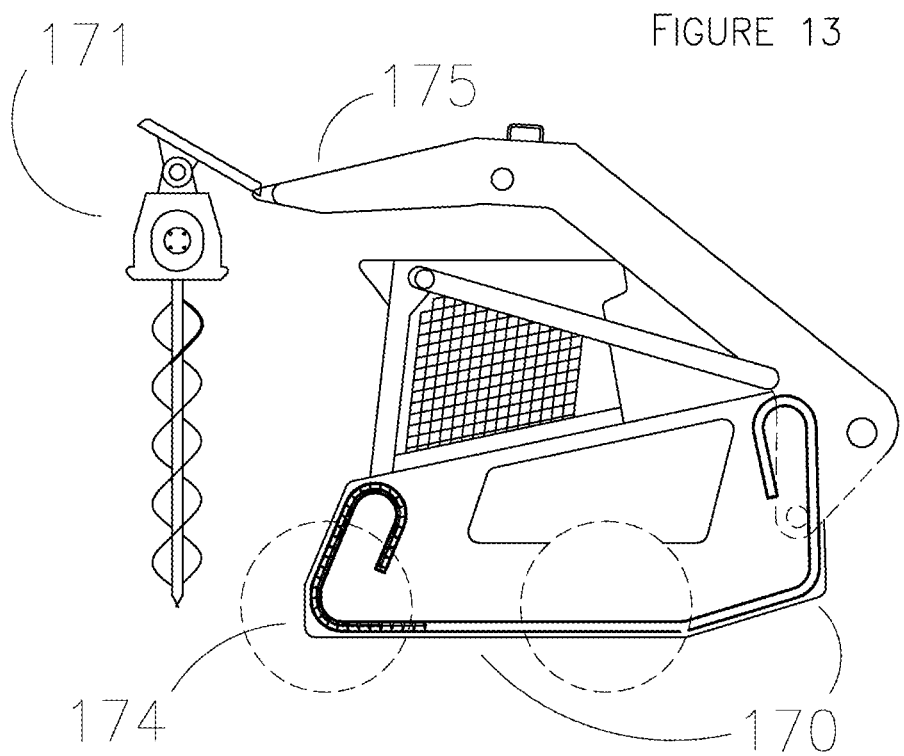
FIG. 13 shows a counterweight requiring downward pressure with a drill attachment.
Figure 14:
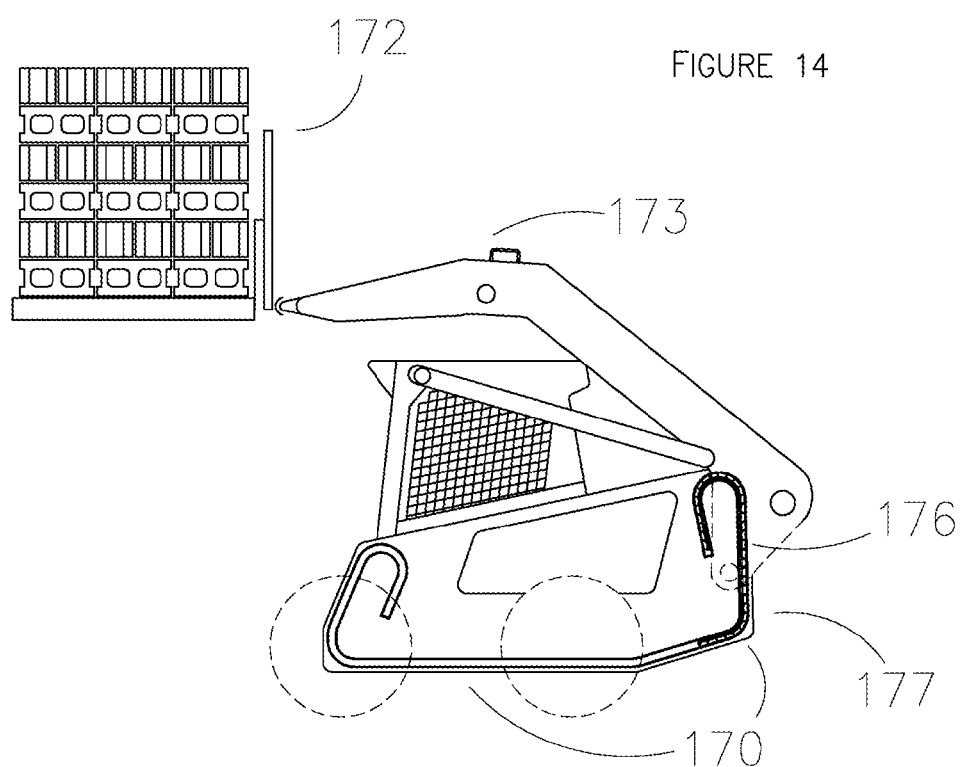
FIG. 14 shows a counterweight requiring rearward counterpressure with a forklift attachment.

The vehicle 100 may have, although not necessarily in all circumstances, a chassis 150 enclosing the vehicle engine, motors, various electrical, hydraulic or pneumatic connections from external damaging articles such as sticks, rocks or debris. Alternatively, said components may be attached near said chassis, either above or below the chassis, for the purpose of being positioned near the vehicle's lowest center of gravity. See FIGS. 13 and 14 depicting the components held within said chassis 170 and FIG. 1 wherein the components are held externally 150.

The chassis is an operator control location such as a seat 152 with control panel 154. Control panel 154 may contain on/off, auto/manual, speed, sensitivity, and direction controls adjustable by the operator in seat 152. A boom 102 raises and lowers a material handling device such as a bucket 104. Boom 102 is disclosed as a lever, but boom 102 could be a hydraulic mast or any other lifting device. With reference to FIGS. 2-6, the vehicle 100 has wheels 156 with axles 158, the rear wheel omitted for visibility in FIG. 2.

The variable counterweight system 1 includes a counterweight 10 and at least one linear transfer device 12. The counterweight 10 preferably includes a plurality of pivoting weight members 14 and a plurality of hanging weight members 16. A top of each hanging weight members 16 is attached to a bottom of an adjacent pivoting weight member 14 with at least two fasteners. A plurality of link slots 20 and a plurality of link clearance slots 22 are cut into each end of each adjacent pivoting weight members 14. A plurality of pivoting links 18 are secured to each pivoting weight members 14 by welding or other suitable process. Each linear transfer device 12 preferably includes a moving track 24 and a drive device 26. However, other types of linear transfer devices may be used, such as a pair of hydraulic cylinders. The moving track 24 could be a chain or a belt. The drive device 26 is preferably a hydraulic, electric or pneumatic motor. The moving track 24 is retained on two rotary axles 28 but may be enabled by at least one rotary axle.

Figure 7:
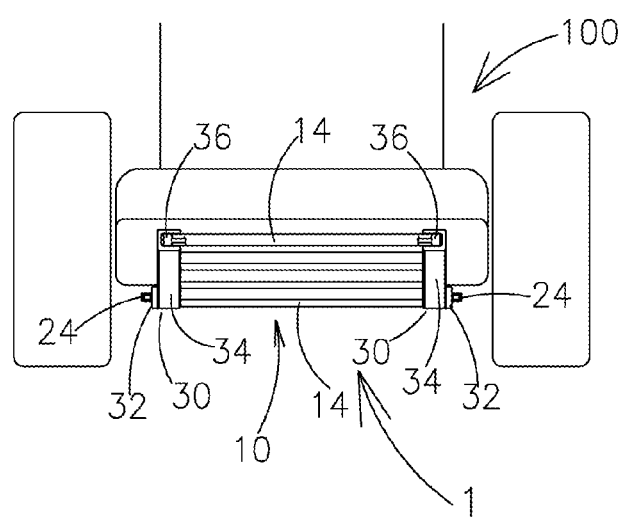
FIG. 7 is a rear view of a material handling vehicle with a variable counterweight system.
Figure 8:
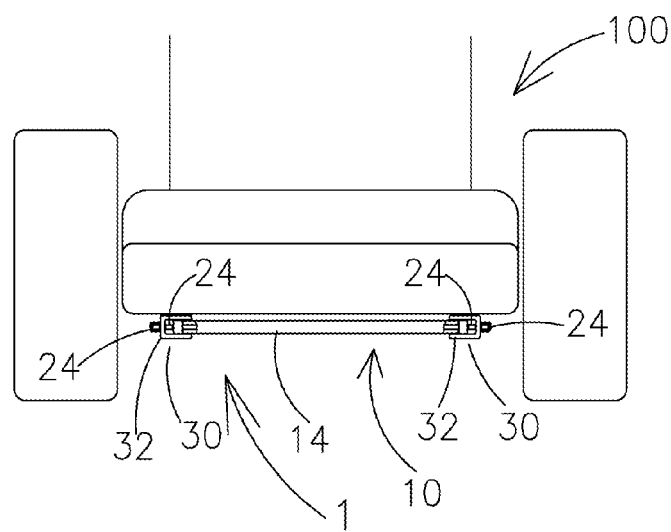
FIG. 8 is a cross sectional of a variable counterweight system mounted to a material handling vehicle.

With reference to FIGS. 7-8, the rotary axles 28 (in FIGS. 3a-eb) may be retained by a guide track 30 or alternatively positioned external and adjacently to said guide track in direct contact with said moving track for purposes of driving said moving track. The moving track 24 is preferably retained in the guide track 30. The guide track 30 is mounted to a bottom of the vehicle 100, or inside the chassis 150. The drive device 26 includes either a sprocket or cog 35 for driving the chain or belt. A pair of idler shafts 37 may be located adjacent the sprocket or cog 35 to guide the moving track 24. The guide track 30 includes a moving track portion 32 and a counterweight portion 34. The moving track portion 32 supports the counterweight 10. A folding bearing 36 may be pivotally retained on each end of at least some of the pivoting weight members 14. The rolling bearing 36 includes a diameter that is greater than a thickness of each pivoting weight bearing 14. The folding bearing 36 rolls within the counterweight 34.

Figure 9:
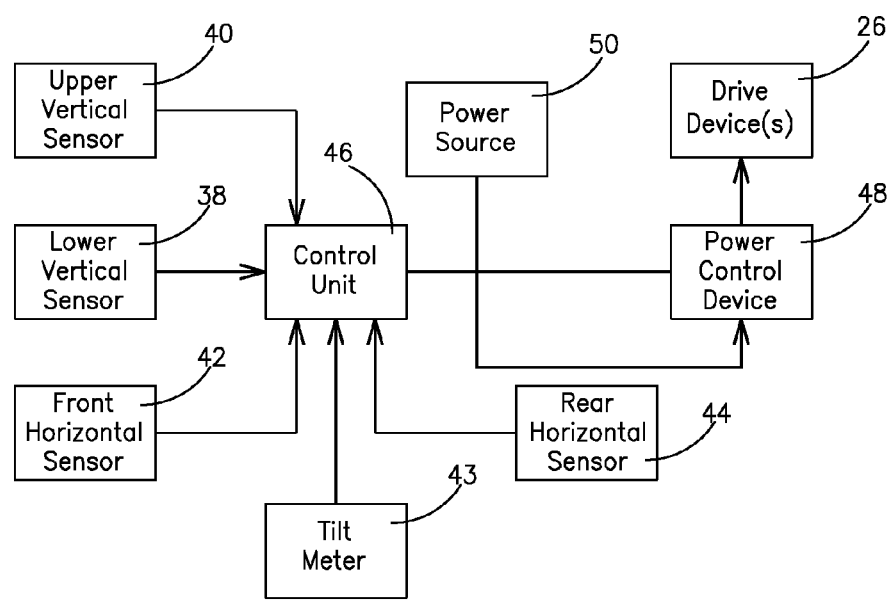
FIG. 9 is a block diagram of a control unit of a variable counterweight system.

With reference to FIGS. 9, 13 and 14, a lower vertical sensor 38 and an upper vertical sensor 40 determine the position of an attachment or a boom 102 of the material handling vehicle 100 according to the position of its weight or pressure load. The attachment could be a bucket 104, a fork lift 172, a grapple, a drill 171, a jackhammer, or other types of attachment. A front horizontal sensor 42 and a rear horizontal sensor 44 determine the position of the counterweight 10 relative to the front and rear of the vehicle 100. A control unit 46 receives input from the upper and lower vertical sensors. Control unit 46 may also control drive devices 26 based on tilt meter 43, which could utilize a gravitometer. The tilt meter is yet another manner of measuring the load position of the machine's functioning pieces relative to its overall position or the counterweight.

If the bucket 104 or the boom 102 are in either an elevated position 173 or a lowered position, then the control unit 46 activates a power control device 48. The power control device 48 could be a hydraulic valve, a relay or any other suitable device. The power control device 48 allows power to flow from a power source 50. The power source 50 could be pressurized hydraulic fluid electricity, or any suitable source of power. Power flows from the power source 50 to the drive device 26, when the power control device 48 is activated. The drive device 26 moves the counterweight 10 to a front of the vehicle 100, if the boom 102 is placed in a lowered position. The drive device 26 is powered, until the front horizontal sensor 42 senses that the counterweight 10 reaches the front of the vehicle 100. The control unit 46 deactivates the power control device 48 to stop the flow of power to the drive device 26. The counterweight 10 located at the front of the vehicle 100 increases pressure on the bucket 104 or other attachment.

The drive device 26 moves the counterweight 10 to the rear of the vehicle 100, 177, if the boom 102 is placed in an elevated position. The drive device 26 is powered, until the rear horizontal sensor 44 senses that the counterweight 10 reaches a rear of the vehicle 100. The control unit 46 deactivates the power control device 48 to stop the flow of power to the drive device 26.

Figure 10:
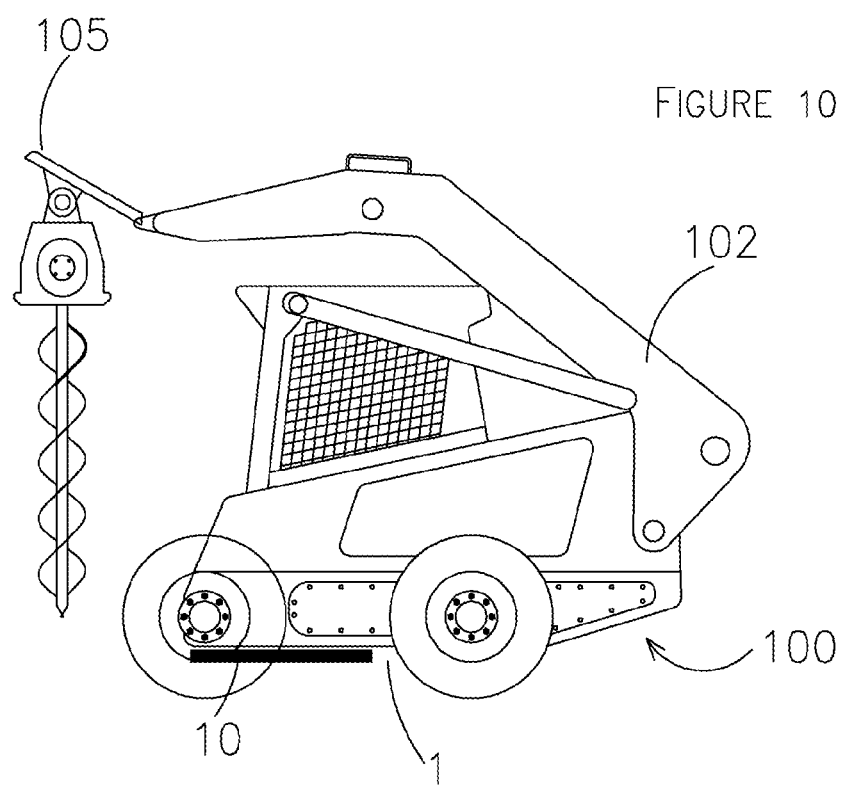
FIG. 10 shows a device requiring downward pressure rather than lifting.

Referring to FIG. 10, the counterweight system 1 may consist of a single counterweight 10, rather than multiple counterweights. Also referring to FIG. 10, the operator may be operating a jackhammer or drill 105, 171 at height, requiring more downward force in what will be termed pushdown mode. Either manually by switching the control panel, or by sensing vehicle tilt by a tilt-meter 43, gravitometer or other means, in pushdown mode, the counterweights are moved forward 174 with the boom upward 175, to counter the force causing the backward tilt from the jackhammer or drill.

Figure 11:
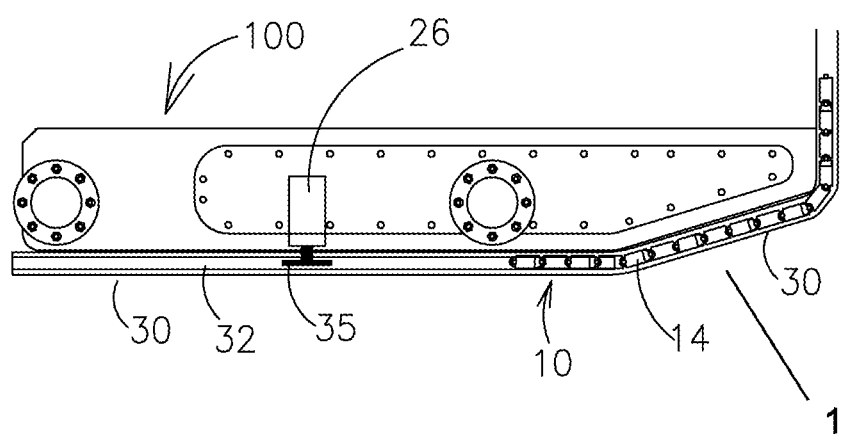
FIG. 11 shows a track creating maximum countereffect.
Figure 12:
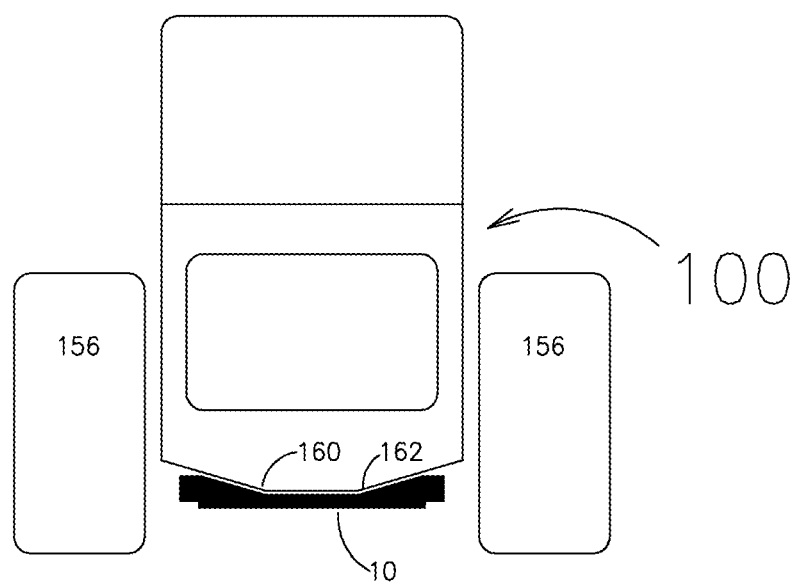
FIG. 12 shows a counterweight which conforms to the shape of the vehicle bottom for maximum weight.

Referring to FIG. 11, to maximize the leverage of the counterweight, the track 30 guiding the weight members 14 may wrap around the rear of the vehicle 100, 176, allowing more of the weights to be at a maximum distance from the front wheels. The track at the rear of the vehicle 100 has an angle of preferably within thirty degrees, and more preferably five degree of vertical when the vehicle 100 is parked on a flat surface. Referring to FIG. 12, to maximize the weight of the counterweight, the lateral top profile 162 of the counterweight may be contoured to the lateral contour 160 of the bottom of the vehicle chassis. For instance, the clearance between the lateral top profile 162 and the lateral bottom profile 160 would conform to within less than an inch. Weight and counteraction is thereby maximized for the allowable space. The invention is not limited to the preferred mode illustrated. For instance, the invention is disclosed as being exterior to the chassis of the vehicle, but could be in the interior of the chassis 170, resulting in less snagging. An additional chassis or cover may enclose the counterweight system 10, alternatively resulting in less snagging. The counterweight system 10 may be comprised of a single weight or multiple weights. These and other variants are within the spirit and scope of the claims below.

What is claimed is:

1. A method for maximizing and varying a counterweight load on a variable counterweighing device attachable to a material handling machine, said method comprising:

A variable counterweighing device attachable to a material handling machine, said variable counterweight device comprising a guide track, said guide track having extendable length, said guide track having one or more straight, angled or curved portions, a moving track held within said extendable guide track, a plurality of individual counterweight members attachable to said moving track, said moving track attached to a rotary axle connected to a drive device, said drive device connected to an energy source;

The method for maximizing and varying a counterweight load on said variable counterweighing device wherein individual counterweight members of said plurality of individual counterweight members are hingely and pivotally connected to said moving track, each connected individual counterweight member being adjacently positioned next to another connected individual counterweight member on said moving track without obstruction with each other such that any attached individual counterweight member may pivot freely at said hinged connection and be transferred in an unobstructed manner through angled or curved portions of said guide track in variable manner.

2. The method for maximizing and varying a counterweight load on a variable counterweighing device of claim 1 wherein said plurality of individual counterweight members is further comprised of at least a parent layer and attachable secondary layers, said parent layer comprising individual counterweight members hingely connected to said moving track in a nonobstructive manner and said attachable secondary layers comprising individual counterweight members connected to an exposed surface of a connected member of a prior layer, the connected individual counterweight members of the various layers having a size and shape dimension that allows the connected counterweight members of the parent layer to pivot freely at said hinged connection and be transferred in an unobstructed manner through angled portions of said guide track in variable manner and without obstruction by connected individual counterweight members of any attached layer.

3. The method of maximizing and varying a counterweight load of a counterweight device on a material handling machine of claim 2, said material handling machine having one or more movable load bearing arms and further having a front end, a rear end, a right side and a left side, wherein said counterweight device of being centrally attached to the bottom of said material handling machine between its right side and left side and wherein said counterweight load of said counterweight device moving frontward and rearward in coordination with changing position and pressure of said movable load bearing arms;

said counterweight load being positionable towards the front end of said material handling machine, maximizing the downward force of said movable load bearing arms;

said counterweight load being positionable towards the rear end of said material handling machine, maximizing the counterbalance effect of said movable load bearing arms.

4. A versatile counterweighing system for counterweighing a material handling machine with movable boom, said system comprising:

A variable counterweighing device comprising a guide track, said guide track having extendable length, said guide track having one or more straight, angled or curved portions, a moving track held within said extendable guide track, a plurality of individual counterweight members attachable to said moving track, said moving track attached to a rotary axle connected to a drive device, said drive device connected to an energy source;

Wherein said plurality of individual counterweight members is further comprised of at least a parent layer and attachable secondary layers, said parent layer comprising individual counterweight members hingely connected to said moving track in a nonobstructive manner and said attachable secondary layers comprising individual counterweight members connected to an exposed surface of a connected member of a prior layer, the connected individual counterweight members of the various layers having a size and shape dimension that allows the connected counterweight members of the parent layer to pivot freely at said hinged connection and be transferrable in an unobstructed manner through angled portions of said guide track without obstruction by connected individual counterweight members of any attached layer;

Wherein the guide track of said counterweighing device is attached to a first side surface of said material handling machine and is continuously extendable to one or more additional adjacent side surfaces of said machine such that the moving track held within said guide track moves forward and rearward in variable manner between multiple adjacent sides of said material handling machine;

Said versatile counterweighing system wherein said counterweighing device being further connected to a control unit and one or more sensors for monitoring and directing the load position of said individual counterweights relative to the load position of said material handling machine to achieve a desired counterweighing effect.

* * * * *